(12) United States Patent
Li et al.

(10) Patent No.: US 8,982,845 B2
(45) Date of Patent: Mar. 17, 2015

(54) MEASUREMENT CONTROL METHOD, SYSTEM AND DEVICE FOR MULTI-CARRIER SYSTEM

(75) Inventors: Haitao Li, Beijing (CN); Jing Liang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 339 days.

(21) Appl. No.: 13/522,590

(22) PCT Filed: Jan. 12, 2011

(86) PCT No.: PCT/CN2011/070196
§ 371 (c)(1),
(2), (4) Date: Jul. 17, 2012

(87) PCT Pub. No.: WO2011/088764
PCT Pub. Date: Jul. 28, 2011

(65) Prior Publication Data
US 2012/0294178 A1 Nov. 22, 2012

(30) Foreign Application Priority Data
Jan. 19, 2010 (CN) .......................... 2010 1 0034263

(51) Int. Cl.
*H04W 4/00* (2009.01)
*H04L 1/00* (2006.01)
*H04L 12/26* (2006.01)
*H04W 24/10* (2009.01)
*H04L 5/00* (2006.01)
(Continued)

(52) U.S. Cl.
CPC .............. *H04W 24/10* (2013.01); *H04L 5/0037* (2013.01); *H04L 5/06* (2013.01); *H04L 27/26* (2013.01)
USPC ............................ 370/332; 370/329; 370/252

(58) Field of Classification Search
CPC .... H04W 24/10; H04W 36/30; H04L 5/0037; H04L 5/06; H04L 27/26
USPC ......................................... 370/252, 329, 332
See application file for complete search history.

(56) References Cited

FOREIGN PATENT DOCUMENTS

| CN | 1972266 A | 5/2007 |
|----|-----------|--------|
| CN | 101415215 A | 4/2009 |

OTHER PUBLICATIONS

3GPP TS 36.331 V8.8.0, "3rd Generation Partnership Proejct; Technical Specification Group radio Access Network; Evolved Universal
(Continued)

*Primary Examiner* — Kwang B Yao
*Assistant Examiner* — Adam Duda
(74) *Attorney, Agent, or Firm* — Harness, Dickey & Pierce, P.L.C.

(57) ABSTRACT

A measurement control method, system and device for a multi-carrier system are disclosed. The method includes that: UE selects the channel quality of a serving carrier or serving carrier group as a reference value, uniformly starts measurement on carriers except serving carriers or serving carrier groups when the reference value is smaller than a measurement starting threshold, s-Measure, configured by an eNB for the serving carriers or serving carrier groups, and uniformly closes the measurement on the carriers except the serving carriers or serving carrier groups when the reference value is larger than or equal to the s-Measure. Through referring to the channel quality of one serving carrier or one serving carrier group, measurement on the carriers except the serving carriers or serving carrier groups is uniformly started and closed, so as to solve the problem that the UE controls measurement according to multi-carrier signal quality in multiple serving cells.

7 Claims, 1 Drawing Sheet an eNB configures a measurement starting threshold, s-Measure, for serving carriers and serving carrier groups of UE — S101 the UE selects the channel quality of a serving carrier or serving carrier group as a reference value, and uniformly starts or closes measurement on carriers except serving carriers or serving carrier groups — S102

(51) Int. Cl.
*H04L 5/06* (2006.01)
*H04L 27/26* (2006.01)

(56) References Cited

OTHER PUBLICATIONS

Terrestrial Radio Access (E-UTRA) Radio Resource Control (RRC); Protocol specification (Release 8)", 3GPP, Dec. 2009, all pages.*

3GPP TSG-RAN WG2 #68 bis, Tdoc R2-100196, Ericsson,ST-Ericsson, "Carrier Aggregation and the s-Measure criterion", Jan. 12, 2010, the whole text.

3GPP TSG-RAN WG2 meeting #68 bis, R2-100063, CATT, "Measurement in in CA", Jan. 12, 2010, section 2.2.

International Search Report: mailed Apr. 14, 2011; PCT/CN2011/070196.

Chinese Office Action for Application No. 2010100342636 and its English translation thereof.

* cited by examiner

MEASUREMENT CONTROL METHOD, SYSTEM AND DEVICE FOR MULTI-CARRIER SYSTEM

FIELD OF THE INVENTION

The present invention relates to communication technologies, and more particularly to a measurement control method, system and device for a multi-carrier system.

BACKGROUND OF THE INVENTION

In a Long Term Evolved (LTE) system, an evolved NodeB (eNB) transmits a measurement configuration message to User Equipment (UE) through a Radio Resource Control (RRC) signaling, and the UE performs measurement according to the contents of the measurement configuration message and reports a measurement result to the network. The network performs measurement configuration through a RRC connection reconfiguration procedure. The measurement configuration message includes a measurement object, report configuration, a measurement identification (ID) and other parameters. There are three triggering modes for measurement report, which include an event triggering report mode, a period triggering report mode and an event triggering and period reporting mode. The three triggering modes are differentiated according to the combination of various parameters in the report configuration.

In the LTE system, the UE works on a single carrier and all mobility frequency measurement of the UE is related to a current serving carrier. The network side configures a measurement start threshold, s-Measure, for the UE, and when the channel quality of the serving carrier is lower than the s-Measure, the UE starts all measurement on the serving carrier. Specifically, the network side configures the s-Measure for the current serving carrier in a measurement configuration Information Element (IE) of a RRC connection reconfiguration message. The configuration of the s-Measure is related to such factors as noise environment and cover scope of an area where the current serving cell is located, a Radio Resource Management (RRM) algorithm of the network side and so on.

However, the peak rate of a LTE Advanced (LTE-A) system is much larger than that of the LTE system. In the LTE-A system, the downlink rate is required to be 1 Gbps at least, and the uplink rate is required to be 500 Mbps at least. At this time, if only one carrier with the maximum bandwidth of 20 MHz is used, it is difficult to meet the requirements of peak rate. Therefore, it is required to extend bandwidth available for UE in the LTE-A system. And thus, a Carrier Aggregation (CA) technology is introduced, that is to say, multiple continuous or discontinuous carriers under the same eNB are aggregated and serves for the UE at the same time, to provide a required rate. The aggregated carriers are also called Component Carriers (CCs). Each cell is a CC, and cells under different eNBs can not be aggregated. In order to ensure that UE in the LTE-A system can work on each aggregated carrier, the maximum bandwidth of each carrier can not be larger than 20 MHz.

There are two schemes for using carriers. Scheme a) is a configuration→activation→scheduling scheme, and scheme b) is a configuration→scheduling scheme. In scheme a), an activation/deactivation procedure is introduced to flexibly start or close CCs according to service amount, so as to reduce power consumption. Moreover, the signaling overhead of the activation/deactivation procedure is small. For a deactivated carrier, the UE reserves the configuration information of the deactivated carrier, and when the channel quality of the deactivated carrier becomes better and the service amount becomes large, the eNB activates the deactivated carrier. In scheme b), the configuration procedure is an activation procedure, i.e., CCs may be scheduled by the network side to be used for data transmission. At present, the problem about whether the activation/deactivation procedure is needed is still discussed, and a mainstream scheme is a fast activation/deactivation procedure implemented through a Physical Downlink Control Channel (PDCCH) order. This scheme is put forward by Ericsson.

The disadvantages of conventional measurement control method are as follows. The working frequency of UE is a single frequency, and the starting and closing of measurement is for a single serving frequency. In the LTE-A system, the UE may be configured to user carrier aggregation. However, it is not considered in the prior art that how mobility measurement parameters are configured for multiple current serving carriers and how the UE starts and closes measurement on carriers except the multiple serving carriers.

Therefore, it is required to provide a solution to solve the above problems.

SUMMARY OF THE INVENTION

An object of the present invention is to solve the above problems, especially to solve the measurement control problem of UE in a multi-carrier aggregation state.

In order to implement the above object, an embodiment of the present invention provides a measurement control method for a multi-carrier system, which includes:

selecting, by User Equipment (UE), the channel quality of a serving carrier or serving carrier group as a reference value, uniformly starting measurement on carriers except serving carriers or serving carrier groups when the reference value is smaller than a measurement starting threshold, s-Measure, configured by an evolved NodeB (eNB) for the serving carriers or serving carrier groups, and uniformly closing the measurement on carriers except serving carriers or serving carrier groups when the reference value is larger than or equal to the s-Measure.

An embodiment of the present invention provides a measurement control method for a multi-carrier system, which includes:

configuring, by an evolved NodeB (eNB), a measurement starting threshold, s-Measure, for serving carriers or serving carrier groups of User Equipment (UE), wherein the s-Measure is compared with a reference value selected by the UE; the UE uniformly starts measurement on carriers except serving carriers or serving carrier groups when the reference value is smaller than the s-Measure, and uniformly closes the measurement on carriers except serving carriers or serving carrier groups when the reference value is larger than or equal to the s-Measure; the reference value is the channel quality of a serving carrier or serving carrier group which is selected by the UE and corresponds to the s-Measure.

An embodiment of the present invention provides a measurement control system for a multi-carrier system, which includes an eNB and UE, where the eNB is configured to configure a measurement starting threshold, s-Measure, for serving carriers or serving carrier groups of the UE; and the UE is configured to select the channel quality of a serving carrier or serving carrier group as a reference value, uniformly start measurement on carriers except serving carriers or serving carrier groups when the reference value is smaller than the s-Measure, and uniformly close the measurement on carriers except serving carriers or serving carrier groups when the reference value is larger than or equal to the s-Measure.

An embodiment of the present invention provides UE, which includes a selecting module, a determining module and a starting module, where the selecting module is configured to select the channel quality of a serving carrier or serving carrier group from all serving carriers or serving carrier groups of the UE as a reference value;

the determining module is configured to compare the reference value with a measurement starting threshold, s-Measure, which corresponds to the reference value, and determine whether to start measurement; and the starting module is configured to uniformly start measurement on carriers except serving carriers or serving carrier groups when the reference value is smaller than the s-Measure, and uniformly close the measurement on carriers except serving carriers or serving carrier groups when the reference value is larger than or equal to the s-Measure.

An embodiment of the present invention provides an eNB, which includes:

a configuring module, configured to configure a measurement starting threshold, s-Measure, for serving carriers or serving carrier groups of User Equipment (UE), wherein the s-Measure is compared with a reference value selected by the UE; the UE uniformly starts measurement on carriers except serving carriers or serving carrier groups when the reference value is smaller than the s-Measure, and uniformly closes the measurement on carriers except serving carriers or serving carrier groups when the reference value is larger than or equal to the s-Measure; the reference value the channel quality of a serving carrier or serving carrier group which is selected by the UE and corresponds to the s-Measure.

In the embodiments of the present invention, through referring to the channel quality of one serving carrier or one serving carrier group, measurement on carriers except serving carriers or serving carrier groups is uniformly started and closed, so as to solve the problem that the UE controls measurement according to multi-carrier signal quality in multiple serving cells.

Additional aspects and/or advantages of the invention will be set forth in part in the description which follows and, in part, will be obvious from the description, or may be learned by practice of the invention.

BRIEF DESCRIPTION OF THE DRAWINGS

The above and/or additional aspects and advantages of the invention will become apparent and more readily appreciated from the following description of the exemplary embodiments, taken in conjunction with the accompanying drawings.

DETAILED DESCRIPTION OF THE INVENTION

Figure 1:
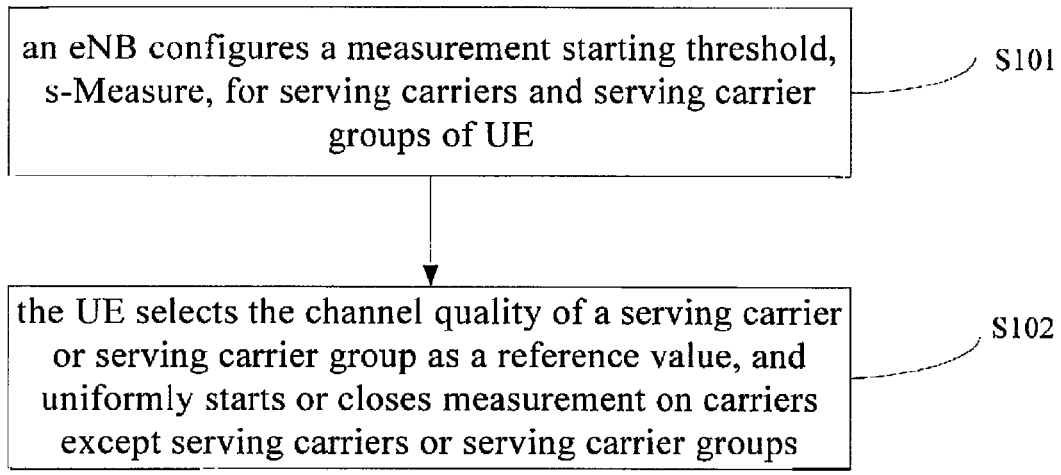
FIG. 1 is a flowchart illustrating a measurement control method for a multi-carrier system according to an embodiment of the present invention.

The embodiments of the present invention are illustrated in detail hereinafter. The examples of the embodiments are illustrated in the accompanying drawings, wherein like reference numerals indicate identical or functionally similar elements throughout. The embodiments illustrated with reference to the accompanying drawings are schematic, and are only used to explain the present invention, but are not used to limit the present invention.

In the embodiments of the present invention, through referring to the channel quality of one serving carrier or one serving carrier group, measurement on carriers except serving carriers or serving carrier groups is uniformly started and closed, so as to solve the problem that the UE controls measurement according to multi-carrier signal quality in multiple serving cells.

The serving carriers at the UE side mentioned in the embodiments of the present invention refer to currently configured carriers, which include carriers which have been configured but have not been activated (suppose the activation/deactivation procedure exists).

FIG. 1 is a flowchart illustrating a measurement control method for a multi-carrier system according to an embodiment of the present invention. As shown in FIG. 1, the method includes following processes.

Block S101, an eNB configures a measurement starting threshold, s-Measure, for serving carriers and serving carrier groups of UE, where the number of carriers or carrier groups may be 0.

Specifically, in this embodiment, there are three schemes for configuring s-Measure for the serving carriers and serving carrier groups by the eNB.

Scheme A: the eNB configures uniform s-Measure for all serving carriers.

Scheme B: the eNB configures respective s-Measure for each serving carrier.

Scheme C: the eNB configures respective s-Measure for each serving carrier group.

Block S102, the UE selects the channel quality of a serving carrier or serving carrier group as a reference value; when the reference value is smaller than the s-Measure which is configured for the serving carriers or serving carrier groups by the eNB, the UE uniformly starts measurement on carriers except serving carriers or serving carrier groups; when the reference value is larger than or equal to the s-Measure, the UE uniformly closes measurement on carriers except serving carriers or serving carrier groups.

Based on the three schemes described in block S101, the UE selects the channel quality of a certain serving carrier or serving carrier group as the reference value; and starts or closes measurement on carriers except serving carriers or serving carrier groups. When the reference value is smaller than the s-Measure which corresponds to the reference value and is configured by the eNB, the UE uniformly starts measurement on carriers except serving carriers or serving carrier groups; when the reference value is larger than or equal to the s-Measure, the UE uniformly closes measurement on carriers except serving carriers or serving carrier groups The serving carrier or serving carrier group whose channel quality is taken as the reference value may be selected according to following principles.

1) The measurement of UE level is started by using a serving carrier or serving carrier group which has the best channel quality in current aggregated carriers of the UE. The channel quality of the serving carrier group is a general evaluation result of channel quality of all serving carriers in the serving carrier group, e.g., an arithmetic average or a weight average; or 2) The measurement of UE level is started by using a serving carrier or serving carrier group which has the worst channel quality in the current aggregated carriers of the UE; or 3) The measurement of UE level is started by using a special cell in the current aggregated carriers of the UE, where the special cell is a carrier providing security parameter input and Non-Access Stratum (NAS) mobility information for the UE.

It should be noted that, scheme A is based on the s-Measure, and the measurement of UE level may be started by referring to the general evaluation result of signal quality of all serving carriers.

It should be understood, the above embodiment is schematic, and is not used to limit the protection scope of the present invention. Those skilled in the art may select the channel quality of another carrier or carrier group as the reference value, and the modification and transformation should be covered by the protection scope of the present invention.

The measurement control method for a multi-carrier system will be illustrated hereinafter in detail with reference to following several specific embodiments. Through the description of the specific embodiments, the above additional aspects and advantages of the present invention will become apparent In an embodiment, the UE works on three CCs, CC-1, CC-2 and CC-3. For the three CCs, the network side respectively configures s-Measure, s-Measure-1, s-Measure-2 and s-Measure-3, for the UE, and configures measurement on some frequencies according to a RRM algorithm. When working on the three CCs, the UE obtains the channel quality of each CC. If the channel quality of each CC of the UE is higher than respective s-Measure, the UE does not start measurement on CCs except CC-1, CC-2 and CC-3, i.e. the measurement of UE level. Afterwards, the channel quality of CC-2 which has the worst channel quality becomes worse, and is lower than s-Measure-2. At this time, the UE starts all configured measurement on CCs except the above three CCs. The measurement procedure includes measuring channel quality of all cells under measurement objects (frequencies) except the above three CCs, i.e., measuring at least one of Reference Signal Receiving Power (RSRP) and Receiving Signal Receiving Quality, (RSRQ) of the cells, where the measurement objects are configured by the network side. Afterwards, if the channel quality of CC-2 becomes better (but is still the worst in the three CCs), and is higher than s-Measure-2 again, the UE closes all configured measurement on CCs except the above three CCs.

In another embodiment, the UE works on three CCs, CC-1, CC-2 and CC-3, and the network side configures s-Measure of UE level for the UE, and configures measurement on some frequencies according to a RRM algorithm. When working on the three CCs, the UE obtains the channel quality of each CC. If the channel quality of CC-1 which has the best channel quality in the three CCs of the UE is higher than the s-Measure, the UE does not start measurement on CCs except the above three CCs, i.e., the measurement of UE level. Afterwards, the channel quality of CC-1 which has the best channel quality becomes worse, and is lower than the s-Measure. At this time, the UE starts all configured measurement on CCs except the above three CCs. Afterwards, if the channel quality of CC-1 becomes better (and is still the best in the three CCs), and is higher than the s-Measure again, the UE closes all configured measurement on CCs except the above three CCs.

In another embodiment, the UE works on four CCs, CC-1, CC-2, CC-3 and CC-4. For two CC groups, i.e., {CC-1, CC-2} and {CC-3, CC-4} the network side respectively configures s-Measure, s-Measure-1 and s-Measure-2, for the UE, and configures measurement on some frequencies according to a RRM algorithm. The UE side checks the channel quality of four CCs, and takes an arithmetic average of the channel quality of CCs in each CC group as the channel quality of the CC group. If the channel quality of each CC group is higher than respective s-Measure, the UE does not start measurement on CCs except the above four CCs and two CC groups, i.e. the measurement of UE level. Afterwards, the channel quality of the CC group {CC-3, CC-4} which has the best channel quality becomes worse, and is lower than s-Measure-2. At this time, the UE starts all configured measurement on CCs except the above four CCs and two CC groups. Afterwards, if the channel quality of the CC group {CC-3, CC-4} becomes better (and is still the best in the two CC groups), and is higher than s-Measure-2 again, the UE closes all configured measurement on CCs except the above four CCs and two CC groups.

In another embodiment, the UE works on three CCs, CC-1, CC-2 and CC-3, where CC-3 is a special cell providing security parameter input and Non-Access Stratum (NAS) mobility parameters. The network side configures s-Measure of UE level for the UE, and configures measurement on some frequencies according to a RRM algorithm. If the channel quality of the special cell of the UE is higher than the s-Measure, the UE does not start measurement on CCs except the above three CCs, i.e., the measurement of UE level. Afterwards, if the channel quality of the special cell becomes worse and is lower than the s-Measure, the UE starts all configured measurement on CCs except the above three CCs. Afterwards, if the channel quality of the special cell becomes better and is higher than the s-Measure again, the UE closes all configured measurement on CCs except the above three CCs.

In another embodiment, the UE works on three CCs, CC-1, CC-2 and CC-3, and the network side configures s-Measure of UE level for the UE, and configures measurement on some frequencies according to a RRM algorithm. The UE performs measurement on all frequencies configured by the network side, checks the channel quality of three CCs, and takes an arithmetic average of the channel quality of three CCs as the channel quality of UE level. If the channel quality of UE level is higher than the s-Measure, the UE does not start measurement on CCs except the above three CCs, i.e. the measurement of UE level. Afterwards, the channel quality of UE level becomes worse and is lower than the s-Measure. At this time, the UE starts all configured measurement on CCs except the above three CCs. Afterwards, if the channel quality of UE level becomes better and is higher than the s-Measure again, the UE closes all configured measurement on CCs except the above three CCs.

In another embodiment, the network side configures three serving CCs. CC-1, CC-2 and CC-3, for the UE, configures s-Measure of UE level for the UE, and configures measurement on some frequencies according to a RRM algorithm. Though the CC-2 is deactivated because of the decrease of data transmission amount, the UE still reserves the configuration information of CC-2. When working on the three CCs, the UE obtains the channel quality of each CC. If the channel quality of CC-1 which has the best channel quality in the three CCs of the UE is higher than the s-Measure, the UE does not start measurement on CCs except the above three CCs, i.e., the measurement of UE level. Afterwards, the channel quality of CC-1 which has the best channel quality becomes worse, and is lower than the s-Measure. At this time, the UE starts all configured measurement on CCs except the above three CCs. Afterwards, if the channel quality of CC-1 becomes better (and is still the best in the three CCs), and is higher than the s-Measure again, the UE closes all configured measurement on CCs except the above three CCs.

In another embodiment, the network side configures three CCs, CC-1, CC-2 and CC-3. Though the CC-2 is deactivated because of the decrease of data transmission amount, the UE still reserves the configuration information of CC-2. The network side configures s-Measure of UE level for the UE, and configures measurement on some frequencies according to a RRM algorithm. If the channel quality of the three CCs of the UE is all higher than the s-Measure, the UE does not start measurement on CCs except the above three CCs, i.e., the measurement of UE level. Afterwards, the channel quality of CC-2 which has the worst channel quality becomes worse, and is lower than the s-Measure. At this time, the UE starts all configured measurement on CCs except the above three CCs. Afterwards, if the channel quality of CC-2 becomes better (but is still the worst in the three CCs), and is higher than the s-Measure again, the UE closes all configured measurement on CCs except the above three CCs.

It should be noted that, the above embodiments are schematic, and are not used to limit the protection scope of the present invention.

Figure 2:
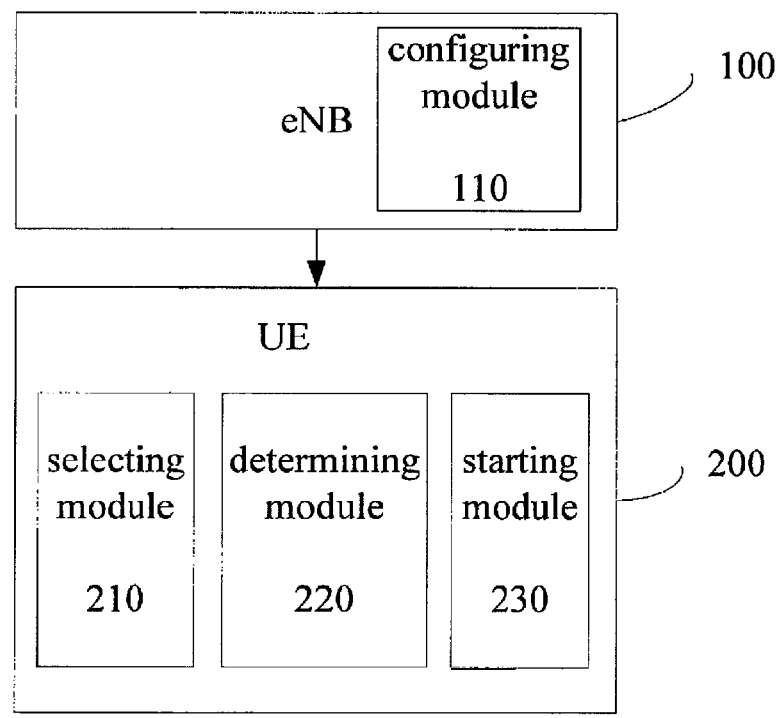
FIG. 2 is a schematic diagram illustrating the structure of a measurement control system for a multi-carrier system according to an embodiment of the present invention.

In order to implement the above method, an embodiment of the present invention provides a measurement control system for a multi-carrier system, as shown in FIG. 2. FIG. 2 is a schematic diagram illustrating the structure of a measurement control system for a multi-carrier system according to an embodiment of the present invention. The system includes an eNB100 and UE 200. The eNB100 is configured to configure s-Measure for serving carriers or serving carrier groups of the UE 200. The number of the serving carriers or serving carrier groups may be 0. There are three schemes for configuring the s-Measure, which include that: the eNB100 configures uniform s-Measure for all serving carriers; the eNB100 configures respective s-Measure for each serving carrier; and the eNB100 configures respective s-Measure for each serving carrier group. The UE 200 is configured to select the channel quality of a serving carrier or serving carrier group as a reference value; when the reference value is smaller than a measurement starting threshold, s-Measure, which is configured for the serving carrier or serving carrier group by the eNB100, uniformly start measurement on carriers except serving carriers or serving carrier groups; when the reference value is larger than or equal to the s-Measure, uniformly close measurement on carriers except serving carriers or serving carrier groups.

The eNB100 includes a configuring module 110, configured to configure the measurement starting threshold, s-Measure, for the serving carriers or serving carrier groups of the UE.

The UE 200 includes a selecting module 210, a determining module 220 and a starting module 230. The selecting module 210 is configured to select the channel quality of a serving carrier or serving carrier group from all serving carriers or serving carrier groups of the UE200 as the reference value; the determining module 220 is configured to compare the reference value selected by the selecting module 210 with the s-Measure which corresponds to the reference value and is configured by the NB 100, and determine whether to start measurement; the starting module 230 is configured to uniformly start or close measurement on carriers except serving carriers and serving carrier groups according to the determining result of the determining module 220.

The selecting module 210 is further configured to select a general evaluation result of channel quality of all serving carriers as the reference value, and the determining module 220 is configured to compare the general evaluation result with the s-Measure which is uniformly configured for all serving carriers by the NB100. When the general evaluation result is smaller than the s-Measure, the starting module 230 uniformly starts measurement on carriers except serving carriers and serving carrier groups. When the general evaluation result is larger than or equal to the s-Measure, the starting module 230 uniformly closes measurement on carriers except serving carriers and serving carrier groups.

In the embodiments of the present invention, through referring to the channel quality of one serving carrier or one serving carrier group, measurement on carriers except serving carriers or serving carrier groups is uniformly started and closed, so as to solve the problem that the UE controls measurement according to multi-carrier signal quality in multiple serving cells.

The foregoing is only preferred embodiments of the present invention. It should be noted that those skilled in the art may make improvement and modification within the principle of the present invention, and the improvement and modification should be covered in the protection scope of the invention.

The invention claimed is:

1. A measurement control method for a multi-carrier system, comprising:
    selecting, by User Equipment (UE), a channel quality of a serving carrier or serving carrier group as a reference value, uniformly starting measurement on carriers except serving carriers or serving carrier groups when the reference value is smaller than a measurement starting threshold, s-Measure, configured by an evolved NodeB (eNB) for the serving carriers or serving carrier groups, and uniformly closing the measurement on the carriers except the serving carriers or serving carrier groups when the reference value is larger than or equal to the s-Measure; wherein the selecting, by the UE, the channel quality of a serving carrier or serving carrier group as the reference value comprises:
    selecting, by the UE, the channel quality of a special cell as the reference value, wherein the special cell is a carrier providing security parameter input and Non-Access Stratum (NAS) mobility information for the UE.

2. The measurement control method of claim 1, wherein the channel quality of the serving carrier group is a general evaluation result of channel quality of all serving carriers in the serving carrier group, wherein the general evaluation result comprises a weight average or arithmetic average of channel quality of all serving carriers in the serving carrier group.

3. The measurement control method of claim 1, wherein the serving carriers or serving carrier groups of the UE comprise carriers which have been configured but not been activated.

4. User Equipment (UE), comprising a selecting module, a determining module and a starting module, wherein
    the selecting module is configured to select a channel quality of a serving carrier or serving carrier group from all serving carriers or serving carrier groups of the UE as a reference value;
    the determining module is configured to compare the reference value with a measurement starting threshold, s-Measure, which corresponds to the reference value, and determine whether to start measurement; and
    the starting module is configured to uniformly start measurement on carriers except serving carriers or serving carrier groups when the reference value is smaller than the s-Measure, and uniformly close the measurement on the carriers except the serving carriers or serving carrier groups when the reference value is larger than or equal to the s-Measure;

wherein the selecting module selects the channel quality of a special cell as the reference value, wherein the special cell is a carrier providing security parameter input and Non-Access Stratum (NAS) mobility information for the UE.

5. The UE of claim 4, wherein the s-Measure is one of:

uniform s-Measure configured for all serving carriers by an evolved NodeB (eNB); or respective s-Measure configured for each serving carrier by the eNB; or respective s-Measure configured for each serving carrier group by the eNB.

6. The UE of claim 4, wherein the channel quality of the serving carrier group is a general evaluation result of channel quality of all serving carriers in the serving carrier group, wherein the general evaluation result comprises a weight average or arithmetic average of channel quality of all serving carriers in the serving carrier group.

7. The UE of claim 4, wherein the serving carriers or serving carrier groups of the UE comprise carriers which have been configured but not been activated.

\* \* \* \* \*